United States Patent
Yoon et al.

(10) Patent No.: US 10,110,554 B2
(45) Date of Patent: Oct. 23, 2018

(54) METHOD AND APPARATUS FOR SUPPORTING MOBILITY OF USER EQUIPMENT

(71) Applicant: ELECTRONICS AND TELECOMMUNICATIONS RESEARCH INSTITUTE, Daejeon (KR)

(72) Inventors: Hyeon Sik Yoon, Daejeon (KR); Boo Geum Jung, Daejeon (KR); Hea Sook Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 672 days.

(21) Appl. No.: 14/678,297

(22) Filed: Apr. 3, 2015

(65) Prior Publication Data
US 2015/0288656 A1  Oct. 8, 2015

(30) Foreign Application Priority Data

Apr. 7, 2014 (KR) .................. 10-2014-0041337

(51) Int. Cl.
*H04L 29/12* (2006.01)
*H04W 8/26* (2009.01)

(52) U.S. Cl.
CPC ........ *H04L 61/2507* (2013.01); *H04L 61/106* (2013.01); *H04L 61/2084* (2013.01); *H04L 61/2535* (2013.01); *H04W 8/26* (2013.01)

(58) Field of Classification Search
CPC ............. H04L 61/2507; H04L 61/2535; H04L 61/106; H04L 61/2084; H04W 8/26
See application file for complete search history.

(56) References Cited

U.S. PATENT DOCUMENTS 7,796,616 B2 9/2010 Kim
2004/0204086 A1* 10/2004 Choi ...................... H04L 12/18
455/557

(Continued)

FOREIGN PATENT DOCUMENTS

| KR | 10-2003-0088723 A | 11/2003 |
| KR | 10-2004-0001254 A | 1/2004 |
| KR | 10-2009-0058881 A | 6/2009 |

(Continued)

*Primary Examiner* — Mandish Randhawa
(74) *Attorney, Agent, or Firm* — LRK Patent Law Firm

(57) ABSTRACT

Provided herein is a network access method and apparatus for supporting mobility of user equipment, the method including receiving information on a private IP (Internet Protocol) address for address conversion from a home network management server; receiving an LISP (Locator/ID Separation Protocol) data frame that includes a private IP address of the user equipment accessed to a current home network; converting the private IP address into a converted private IP address based on the information on a private IP address for address conversion; and transmitting data that has its basis on the LISP data frame to the home network apparatus based on the conversed private IP address, wherein the home network apparatus is an apparatus that the user equipment intends to access and that is accessed to the access home network.

10 Claims, 6 Drawing Sheets

(56) References Cited

U.S. PATENT DOCUMENTS

2012/0177049 A1\* 7/2012 Xu .......................... H04L 45/64
  370/392
2014/0006586 A1\* 1/2014 Hong .................. H04L 61/6004
  709/223

FOREIGN PATENT DOCUMENTS

KR  10-1096402 B1  12/2011
KR  10-1209812 B1  12/2012

\* cited by examiner

METHOD AND APPARATUS FOR SUPPORTING MOBILITY OF USER EQUIPMENT

CROSS-REFERENCE TO RELATED APPLICATION

The present application claims priority to Korean patent application number 10-2014-0041337 filed on Apr. 7, 2014, the entire disclosure of which is incorporated herein in its entirety by reference

BACKGROUND

Field of Invention

Various embodiments of the present disclosure relate to a network access method, and more particularly, to a network access method and apparatus for supporting mobility of user equipment.

Description of Related Art

Today's Internet has a severe scalability problem regarding routing and addressing. The scalability problem may occur due to multihoming, traffic engineering, and nonaggregatable address allocation. Due to such a scalability problem, there occurs a phenomenon where the size of a routing table in a default route free zone increases geometrically.

The multihoming which is the reason behind the increase of routing table entries refers to a site having multi-path for accessing the Internet, thereby guaranteeing one or more paths for accessing the Internet to use in case a problem occurs. This is because an address block allocated to a site that is connected to the Internet through a plurality of ISPs (Internet Service Providers) must be stored in different ISP routing tables. The traffic engineering which is another reason behind the increase of routing table entries may have a path to a destination that is different from the shortest path on the topology, and thus each piece of path information must be individually stored in the routing table, thereby causing the problem of scalability. The nonaggregatable address allocation which is another reason behind the increase of routing table entries causes the problem of scalability since topological aggregation is the only method for controlling the increase of routing table entries. Due to these reasons, the size of routing tables in an Internet default route free zone is increasing rapidly, and thus the performance of a router may soon reach its limitations.

The IETF (Internet Engineering Task Force) held an ROAP (Routing and Addressing Problem) BoF (Birds of a Feather) conference in an IETF conference in order to resolve the scalability problem of routing and addressing. A method determined in this conference was to design a new Internet architecture, a structure of separating an identifier and a locator.

The current IP (Internet Protocol) addresses use both the meaning of an identifier and a locator of an end host, and thus when a host in communication moves, the IP address of the host changes. Such a change of an IP address means a change in both the identifier and the locator of a host in communication, that is, a session in communication being disconnected, making it difficult to perform a continuous seamless service. The same goes with multihoming trying to resume communication through another link when a problem occurs during communication. Therefore, considering the mobility and multihoming of a mobile host, the location of the mobile host must be dynamically changed for routing to the exact current location, whereas the identifier of the mobile host must not be changed but maintain the session in communication for a sustainable service. Therefore, to provide mobility and multihoming of the host, the identifier and the location of the host must be separated from each other.

SUMMARY

Various embodiments of the present disclosure are directed to a network access method for supporting mobility of user equipment.

Furthermore, various embodiments of the present disclosure are directed to an apparatus for realizing a network access method for supporting mobility of user equipment.

An embodiment of the present disclosure provides a network access method for supporting mobility of user equipment, the method including receiving, by an access home gateway of an access home network, information on a private IP (Internet Protocol) address for address conversion from a home network management server; receiving, by the access home gateway, an LISP (Locator/ID Separation Protocol) data frame that includes a private IP address of the user equipment accessed to a current home network; converting, by the access home gateway, the private IP address into a converted private IP address based on the information on a private IP address for address conversion; and transmitting, by the access home gateway, data that has its basis on the LISP data frame to the home network apparatus based on the conversed private IP address, wherein the home network apparatus may be an apparatus that the user equipment intends to access and that is accessed to the access home network. The method may further include receiving, by the access home gateway, response data regarding the LISP data frame from the home network apparatus; converting, by the access home gateway, the converted private IP address into the private IP address; and transmitting, by the access home gateway, the LISP response frame generated based on the private IP address and response data. A header of the LISP data frame may include information on a source RLOC (Routing Locator) and destination RLOC, the source RLOC being an identifier for indicating the current home network, and the destination RLOC being an identifier for indicating the access home network. The information on a private IP address for address conversion may include information on another private IP address prefix for avoiding collision by duplicated use of an EID (Endpoint Identifier) that has its basis on a private IP address. The method may further include receiving, by the access home gateway, a home network apparatus registration request frame that includes identifier information of the home network apparatus; transmitting, by the access home gateway, the home network apparatus registration request frame to the home network management server; and receiving, by the access home gateway, information on a result of registration of the home network apparatus from the home network management server. The home network management server may be configured to transmit the information on a private IP address for address conversion, in response to information on an RLOC of the access home network being requested by the home gateway of the current home network.

Another embodiment of the present disclosure provides an access home gateway of an access home network for supporting mobility of user equipment, the access home gateway including a processor configured to receive information on a private IP (Internet Protocol) address from a home network management server; the access home gateway configured to receive an LISP (Locator/ID Separation Protocol) data frame that includes a private IP address of the user equipment accessed to a current home network, convert the private IP address into a converted private IP address based on information on a private IP address for address conversion, and transmit data that has its basis on the LISP data frame to the home network apparatus based on the converted private IP address, wherein the home network apparatus may be an apparatus that the user equipment intends to access and that is accessed to the access home network. The processor may be configured to receive response data regarding the LISP data frame from the home network apparatus, convert the converted private IP address into the private IP address, and transmit the LISP response frame generated based on the private IP address and response data. A header of the LISP data frame may include information on a source RLOC (Routing Locator) and a destination RLOC, the source RLOC being an identifier for indicating the current home network, and the destination RLOC being an identifier for indicating the access home network. The information on a private IP address for address conversion may include information on another private IP address prefix for avoiding collision by duplicated use of an EID (Endpoint Identifier) that has its basis on a private IP address. The processor may be configured to receive a home network apparatus registration request frame that includes identifier information of the home network apparatus, transmit the home network apparatus registration request frame to the home network management server, and receive information on a result of registration of the home network apparatus from the home network management server. The home network management server may be configured to transmit the information on a private IP address for address conversion, in response to information on a RLOC of the access home network being requested by the home gateway of the current home network.

As aforementioned, by using a network access method and apparatus for supporting mobility of user equipment according to an embodiment of the present disclosure, it is possible for a user to access apparatuses of his/her home network from outside while preventing an address of his/her home network from being exposed and resolving collision between a private IP address of the accessed network and a private IP address of his/her home network. Therefore, it is possible to realize a home network capable of guaranteeing security safety of the home network and using IP addresses efficiently.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
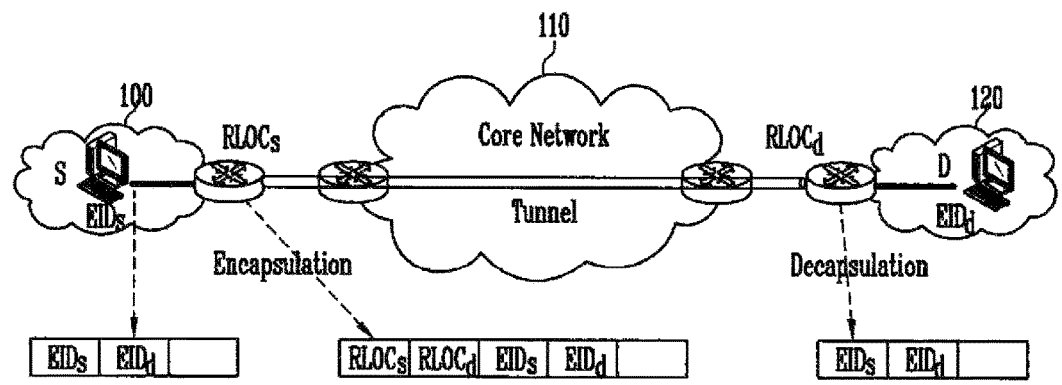
FIG. 1 is a view illustrating a concept of the operation of the LISP protocol.

Hereinafter, embodiments will be described in greater detail with reference to the accompanying drawings. Embodiments are described herein with reference to cross-sectional illustrations that are schematic illustrations of embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

Generally, a home network technology refers to the technology connecting information and electronic appliances within homes and offices based on a wired or wireless network. By realizing the home network technology, it is possible to construct various high quality home service environments without constraints of time and space.

A home network may be realized as a private network that has its basis on an IP (Internet Protocol), wherein various devices used at homes (for example, various types of personal computers and intelligence products, and wireless devices etc.) may be connected and controlled through an IP based network. Furthermore, the home network may provide connection with an external network through a home gateway. When the home gateway discovers a device trying to access the home network, it may create and grant an address for communication with the device trying to access the home network and register it as a home network device. When registering the home network device, the home gateway may store information on functions, services and performance of the registered home network device.

Generally, home network devices included in a home network may perform networking based on a private IP address in the home network. When a home network device connected to the home network intends to access an external network, it may use an NAT (Network Address Translation) function of the home gateway. The NAT of the home gateway performs an operation of converting a private IP address into a public IP address. By converting the private IP address granted to the home network device into a public IP address through the NAT, the home network devices may be enabled to access the external network.

For example, there may be a case where a home network device registered in a first home network intends to access its home network from a second home network (another home network) through a backbone network. In such a case, a conventional home network device would convert a private IP address into a public IP address based on the NAT in order to access from the currently accessed second home network to the first home network. Furthermore, other home network devices connected to the first home network that the home network device intends to access would convert a private IP address into a public IP address as well. In such a case, for address conversion, it is necessary to allocate numerous public IP addresses to the home network. Furthermore, there would also occur a serious security problem of the addresses of the home network devices being exposed to the backbone network.

Hereinafter, an effective home network access method will be explained where a specific network device may access its home network from another home network while preventing addresses of home network devices being exposed to the backbone network, and resolving collision between private IP addresses used in each home network.

FIG. 1 is a view of a concept of the operation of the LISP protocol.

The LISP protocol may be used to resolve various conventional problems on a network that occur as an IP address performs a role of a locator and a role of an identifier at the same time.

The LISP protocol may divide an address system into an EID (Endpoint Identifier) for identifying an individual terminal and an RLOC (Routing Locator) used to identify and route a location of a network where the terminal belongs to. The LISP protocol defines a collection of information that routers exchange to map the EID and RLOC, and defines a mechanism in which LISP routers route and forward a packet transmitted from user equipment to other user equipment through the backbone network.

Specifically, referring to FIG. 1, the LISP protocol may be divided into an IP address area (RLOC: Routing Locator) that is used in a core network 110, and an ID area (EID: Endpoint Identifier) that is used in communication between end systems and is meaningful in each site such as a home network. In the LISP protocol, each data may be exchanged in each site based on tunneling routers such as an ITR (Ingress Tunnel Router) and an ETR (Egress Tunnel Router). For example, in a case of sending a data packet from EIDs, that is an address of an S transmitter 100, to EIDd, that is an address of a D receiver 120, address information of [EIDs, EIDd] may be generated. This address may be changed into [RLOCs, RLOCd] as it goes through an encapsulation operation of ITR. RLOCs is an address of the transmitter 100 used in the core network, and RLOCd is an address of the receiver 120 used in the core network. In a case where a data packet is transmitted to ETR, the data packet may be changed into [EIDs, EIDd] again based on a decapsulation operation of ETR and transmitted to D, that is the receiver 120.

LISP related standards are defined in the IETF (Internet Engineering Task Force), and currently there are standards of RFC6830, RFC6831, RFC6832, RFC6833, RFC6834, RFC6835, RFC6836 and RFC6837.

Hereinafter, a method for user equipment to access a home network based on the LISP protocol will be explained.

Hereinafter, an apparatus capable of networking in a home network is defined as a UE (user equipment). The user equipment may be static or have mobility, and may be called by another terms such as an MS (mobile station), MT (mobile terminal), UT (user terminal), SS (subscriber station), wireless device, PDA (personal digital assistant), wireless modem, and handheld device etc.

Furthermore, a network currently accessed by the user equipment is defined as a current home network, and a home network that the user equipment intends to access is defined as an access home network. It is assumed that the user equipment is user equipment already registered in the access home network. Furthermore, a packet that includes data may be called by various terms such as data packet, and data frame etc.

Figure 2:
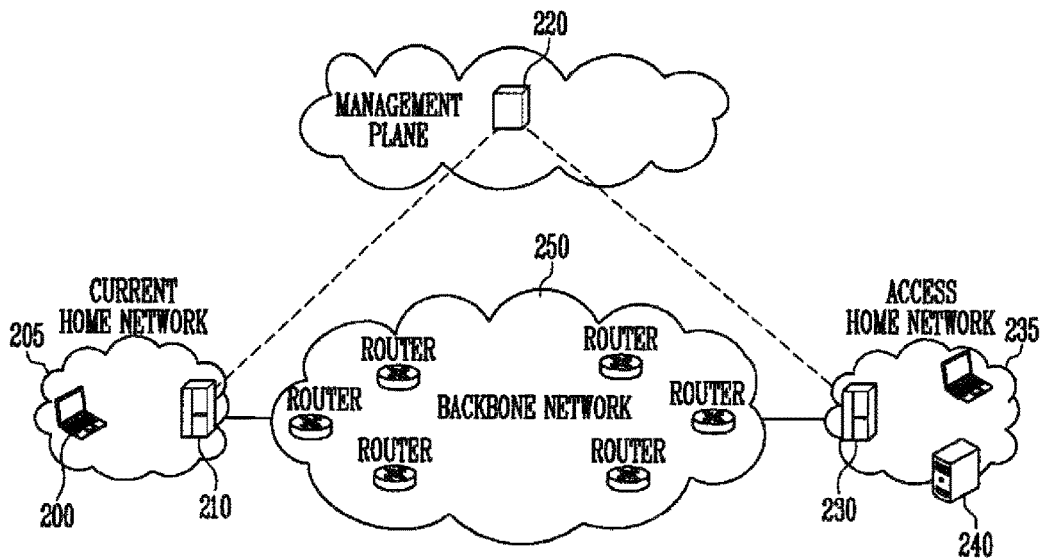
FIG. 2 is a view illustrating a concept of a home network access method of user equipment according to an embodiment of the present disclosure.

FIG. 2 is a view of a concept of a home network access method of user equipment according to an embodiment of the present disclosure.

FIG. 2 illustrates a method in which user equipment 200 accesses from a current home network to an access home network based on LISP (Locator/ID Separation Protocol).

Referring to FIG. 2, a home network access method of user equipment 200 according to an embodiment of the present disclosure may be performed based on a current home network 205, gateway 210 of the current home network, home network management server 220, gateway 230 of an access home network, and access home network 235. The current home network and the access home network may be connected through a backbone network 250.

The user equipment 200 may be user equipment preregistered in the access home network. When the user equipment 200 accesses a specific home network, the specific home network may transmit information on the user equipment 200 to the home network management server 220 through the home gateway. Information on the user equipment 200 stored in the home network management server 220 may be used by the user equipment 200 to perform an authentication procedure when accessing the specific home network (for example, access home network) from outside.

The current home network 205 is the home network that the user equipment 200 is currently accessing. The gateway of the current home network 205 may play the role of the ITR 210, and may transmit data generated from the user equipment 200 to the core network. Hereinafter, the gateway of the current home network 205 will be referred to as the ITR 210 for convenience of explanation.

The home network management server 220 may perform an operation for managing and controlling the home gateway, home network apparatus and other information in each home network. The home network management server 220 may perform the function of the map server.

The gateway (access home gateway) of the access home network 235 may play the role of the ETR 230, and may receive a data frame generated from the user equipment 200. Hereinafter, the gateway of the access home network 235 will be referred to as the ETR 230 for convenience of explanation.

The access home network 235 is the home network that the user equipment 200 intends to access.

Home gateways of each home network may operate as the ITR 210 and ETR 230, and the ITR 210 and ETR 230 may be differentiated depending on the direction in which the data frame (or packet) for access is transmitted in the user equipment. Depending on the transmission and reception of the data frame (or packet), one router may perform the role of the ITR 210 and the role of the ETR 230 at the same time.

For the user equipment 200 to access the access home network 235 from the current home network 205, each network element may perform an operation as will be explained below.

The user equipment 200 may perform an authentication procedure through the home network management server 220, and be allocated with a home network ID for accessing the access home network 235. For example, the user equipment 200 may transmit a user authentication request frame for requesting a user authentication to the home network management server 220 through routers of the backbone network 250. The user authentication request frame may include user equipment identification information for identifying the user equipment 200. The home network management server 220 that receives the user authentication request frame may determine whether or not the user equipment 200 is the user equipment registered in the home network management server 220 based on the user equipment identification information included in the user authentication request frame.

When the user equipment 200 is the user equipment registered in the home network management server 220, the home network management server 220 may allocate a home network ID to the user equipment 200. For example, the home network management server 220 may search for information on the home network where the user equipment 200 is registered based on the identifier information of the user equipment 200, and transmit the information on the home network where the user equipment 200 is registered (for example, home network ID). When the user equipment 200 is the user equipment registered in the access home network 235, the home network ID may include information for identifying the access home network 235. That is, the home network ID may be information for identifying the access home network 235. The home network ID may be used later for the user equipment 200 to access the access home network 235. When authentication of the user equipment 200 fails in the home network management server 220, the home network management server 220 may transmit to the user equipment 200 a message indicating that the authentication fails or discard the packet transmitted from the user equipment 200.

When the user equipment 200 succeeds authentication with the home network management server 220 and receives information on the home network ID, the user equipment 200 may transmit an access request frame to the ITR 210. The access request frame may be used by the user equipment 200 to access the access home network 235. The access request frame may include, for example, identifier information of the access home network 235 that the user equipment 200 intends to access (for example, home network ID), identifier information on the user equipment 200 (for example, source IP address), and identifier information of the network apparatus of the access home network 235 that the user equipment 200 intends to access (for example, destination IP address).

The ITR 210 that receives the access request frame may request the home network management server 220 for RLOC information of the access home network 235 based on the home network ID information of the user equipment 200. For example, the ITR 210 may transmit the RLOC information request frame that includes the home network ID information to the home network management server 220 and request the home network management server 220 for the RLOC information.

Upon receiving the RLOC information request frame, the home network management server 220 may transmit to the ITR 210 the RLOC information response frame that includes the RLOC information that has its basis on the home network ID. Furthermore, the home network management server 220 may transmit to the ETR 230 information on a private IP address for address conversion. The private IP address for address conversion may be used to avoid collision caused by duplicated use of EID based on the related private IP address. The home network management server 220 allocates another private IP address prefix for private IP address conversion.

The ITR 210 may generate an LISP data frame based on the RLOC information response frame received from the home network management server 220 and transmit the LISP data frame to the ETR 230 through the routers of the backbone network 250. For example, in the LISP data frame, information on the home network apparatus 240 of the access home network 235 and request information may be included.

The ITR 210 may add a source RLOC and destination RLOC header to the LISP data frame based on the RLOC regarding the ETR 230 of the access home network 235 that the user equipment 200 intends to access. The RLOC is a legitimate routing suffix, and thus the corresponding packet may arrive at the ETR 230 through the ordinary Internet routing. The ETR 230 may strip away the source RLOC and destination RLOC by an operation opposite to the ITR 210, and may transmit to the access home network 235 the original IP packet having source EID and destination EID, that is, the source IP address and destination IP address.

That is, the LISP data frame may include a tunnel header that has the RLOC information of the access home network 235 as the destination address and has the RLOC information of the current home network 205 as the source address. The header of the LISP data frame may be implemented by encapsulating a necessary header according to the format of the LISP data frame.

The ETR 230 may receive the LISP data frame, and determine whether or not the user equipment 200 may access based on the LISP data frame received. For example, the ETR 230 may determine whether or not the EID of the network apparatus 240 that the user equipment 200 intends to access is the EID registered in the access home network 235. That is, the ETR 230 may determine whether or not there is a network apparatus 240 in the access home network 235.

If the EID of the home network apparatus 240 that the user equipment 200 intends to access is the EID registered in the access home network 235, it is possible to additionally decapsulate the header of the LISP data frame and perform a private IP address conversion of the home network apparatus 240. The private IP address conversion may be performed using the private IP address for address conversion allocated by the home network management server 220. That is, the address conversion performed in an embodiment of the present disclosure is not an address conversion between a public IP address and a private IP address performed in an ordinary NAT device, but may be an address conversion from a private TP address into another private IP address that is based on the private IP address for address conversion. By using such an address conversion process, when the user equipment 200 accesses the access home network 235, it is possible to avoid the problem of collision between apparatuses that may occur due to duplication of private IP address allocated to the corresponding access home network 235. The private IP address of the home network apparatus 200 converted based on the private IP address for address conversion may be defined as a converted private IP address.

Through such a process, the user equipment 200 may access from the current home network 205 to the home network apparatus 240 located in the access home network 235. The LISP response frame generated from the home network apparatus 240 of the access home network 235 may be transmitted to the user equipment 200 as well. After performing an address conversion that is opposite to the previous address conversion, the ETR 230 may encapsulate the LISP header and transmit the LISP response frame to the user equipment 200. That is, it is possible to convert the converted private IP address of the home network apparatus based on the private IP address for address conversion into the original private IP address and encapsulate the LISP header of the LISP response frame.

By the aforementioned operation procedure, the user equipment 200 that is located in the current home network 205 may access the access home network 235. By using such an access method of the user equipment 200, it is possible to guarantee address concealment of the home network, and resolve the overlapping problem of the private IP address.

Figure 3:
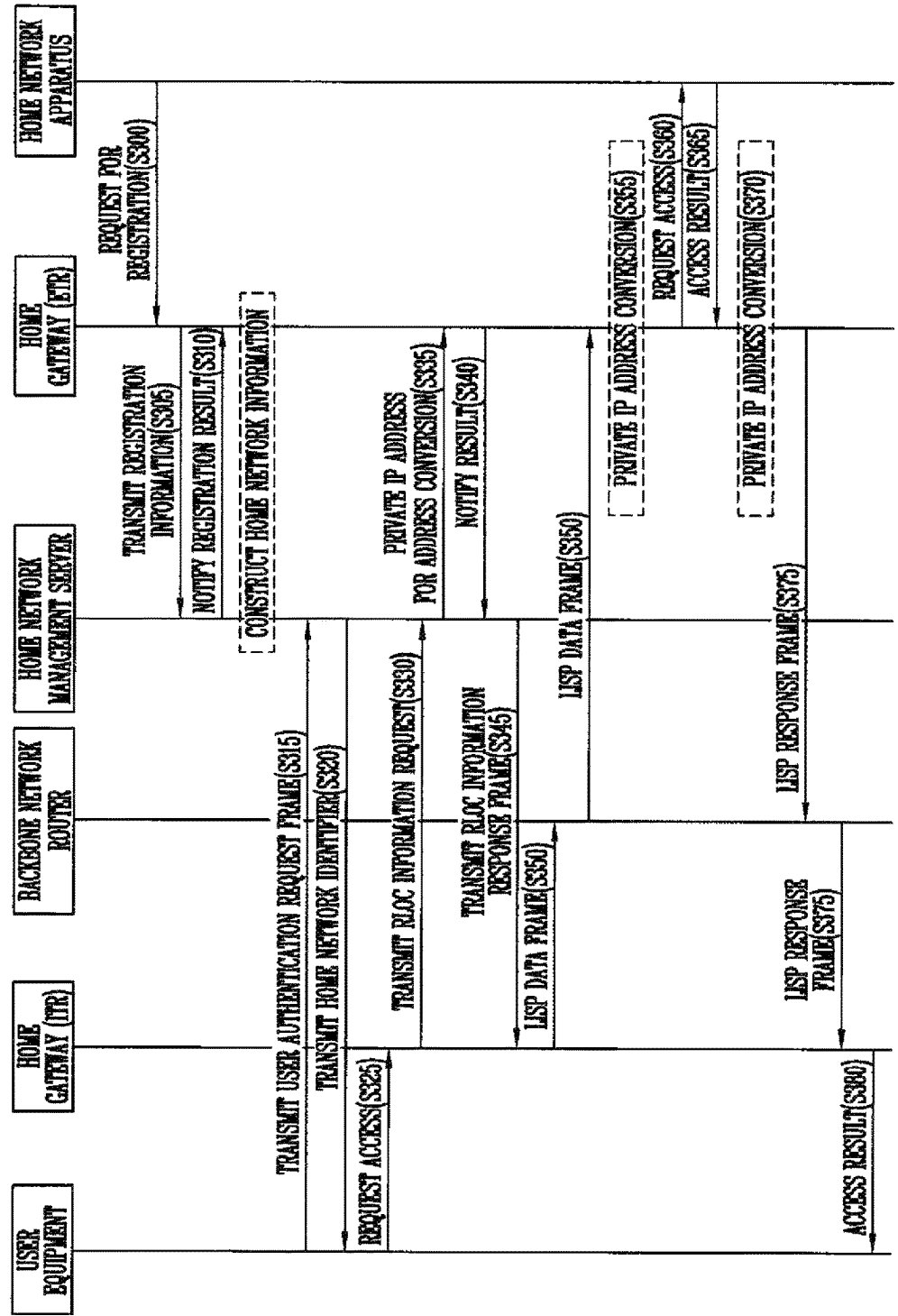
FIG. 3 is a flowchart illustrating a home network access method of user equipment according to an embodiment of the present disclosure.

FIG. 3 is a flowchart illustrating a home network access method of user equipment according to an embodiment of the present disclosure.

Referring to FIG. 3, the process of registering the user equipment in the access home network as the home network apparatus may be performed when the user equipment transmits the home network equipment registration request frame to the home gateway of the access home network (S300). The home gateway of the access home network that receives the home network apparatus registration request frame may request the home network management server to register the user equipment as the home network apparatus (S305). The home network management server may receive information on the user equipment, and register the user equipment as the home network apparatus of the access home network based on the information received, and transmit a result of registration to the home gateway of the access home network (S310). By this method, the access home network may register the user equipment in the home network management server and construct the home network information.

In an embodiment of the present disclosure to be explained hereinafter, it is assumed that the user equipment is the equipment already registered in the home network management server through the access home network, and that now it is accessed not to the access home network but to another external network (hereinafter, current home network).

The user equipment may perform an authentication procedure through the home network management server, and may be allocated with a home network ID for accessing the access home network. For example, the user equipment may transmit to the home network management server a user authentication request frame for requesting user authentication through an ITR and routers of the backbone network (S315). In the user authentication request frame, user equipment identification information that is information for identifying user equipment may be included. Upon receiving the user authentication request frame, the home network management server may determine whether or not the user equipment is the user equipment registered in the home network management server based on the user equipment identification information included in the user authentication request frame.

When the user equipment is the user equipment registered in the home network management server, the home network management server may allocate a home network ID to the user equipment (S320). The home network ID is information for identifying the access home network, which may be used by the user equipment to access the access home network.

When the user equipment succeeds in the authentication procedure with the home network management server and is allocated with the home network ID, the user equipment may transmit an access request frame to the ITR (S325). The access request frame may be used by the user equipment to access the access home network.

The ITR that receives the access request frame may request the home network management server for RLOC information of the access home network based on the home network ID information of the user equipment. The ITR may transmit to the home network management server the RLOC information request frame that includes the home network ID information (S330).

Upon receiving the RLOC information request frame, the home network management server in turn may transmit to the ITR the RLOC information response frame that includes the RLOC information that has its basis on the home network ID (S345).

Furthermore, the home network management server may transmit to the ETR information on the private IP address for address conversion (S335). The private IP address for address conversion may be used to avoid collision that may occur when the EID of the network apparatus used in the home network and the EID of the user equipment are repeatedly used. The ETR may transmit to the home network management server the result information for instructing that the private IP address for address conversion has been received without any error (S340).

The ITR may generate an LISP data frame based on the RLOC information response frame received from the home network management server and transmit the generated LISP data frame to the ETR through the routers of the backbone network (S350). The LISP data frame may include a tunnel IP header that has the RLOC information of the access home network as the destination IP address and has the RLOC information of the current home network as the source IP address.

The ETR may receive the LISP data frame, and determine whether or not the user equipment may access based on the received LISP data frame. If the EID of the network apparatus that the user equipment intends to access is the EID registered in the access home network, it is possible to additionally decapsulate the tunnel IP header of the LISP data frame and perform a private IP address conversion of the home network apparatus that the user equipment intends to access (S355). The private IP address conversion may be performed using the private IP address for address conversion allocated from the home network management server.

It is possible to access the home network apparatus of the access home network based on the converted private IP address (S360), and receive information on the result of access from the home network apparatus (S365).

Through such a process, the user equipment may access the home network apparatus within access home network from the current home network. The LISP response frame generated from the home network apparatus of the access home network may also be transmitted to the user equipment. The ETR may perform an address conversion that is opposite to the previous address conversion, and transmit the LISP response frame having the encapsulated tunnel IP header to the user equipment. That is, the converted private IP address allocated to the home network apparatus may be converted to the original private IP address by the address conversion, and then be included in the LISP response frame (S370).

The LISP response frame may be transmitted to the user equipment through the routers of the backbone network and an ITR (S375 and S380).

Figure 4:
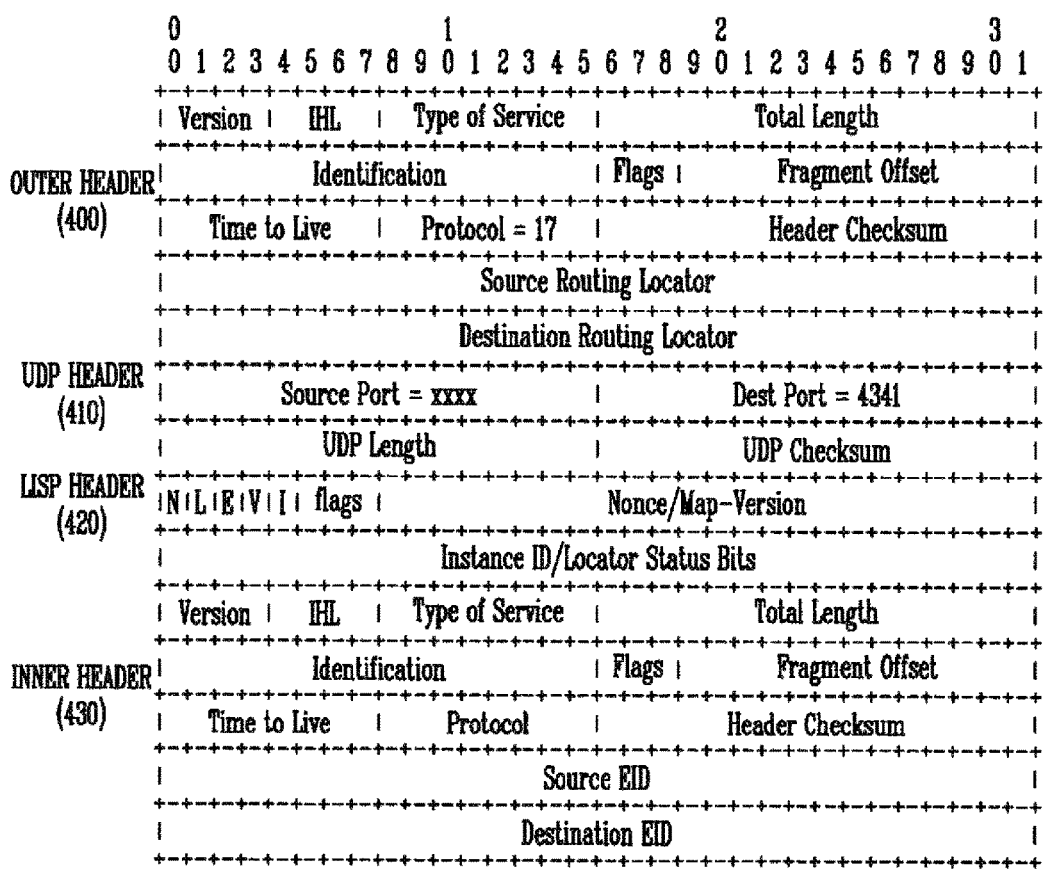
FIG. 4 is a view of a concept of header of an LISP data frame according to an embodiment of the present disclosure.

FIG. 4 is a view of a concept of the header of the LISP data frame according to an embodiment of the present disclosure.

Referring to FIG. 4, the header of the LISP data frame may include an outer header 400, UDP header (user datagram protocol header) 410, LISP header 420, and inner header 430. Of these, in the outer header 400 and inner header 430, information related to the RLOC/EID may be included.

The outer header 400 may be added by the ITR. The source routing locator of the outer header 400 may include information on the RLOC of the current home network, and the destination routing locator of the outer header 400 may include information on the RLOC of the access home network.

The inner header 430 may include, in the source EID, information on the EID of the user equipment, and may include, in the destination EID, information on the EID of the network apparatus that the user equipment intends to access in the access home network.

Figure 5:
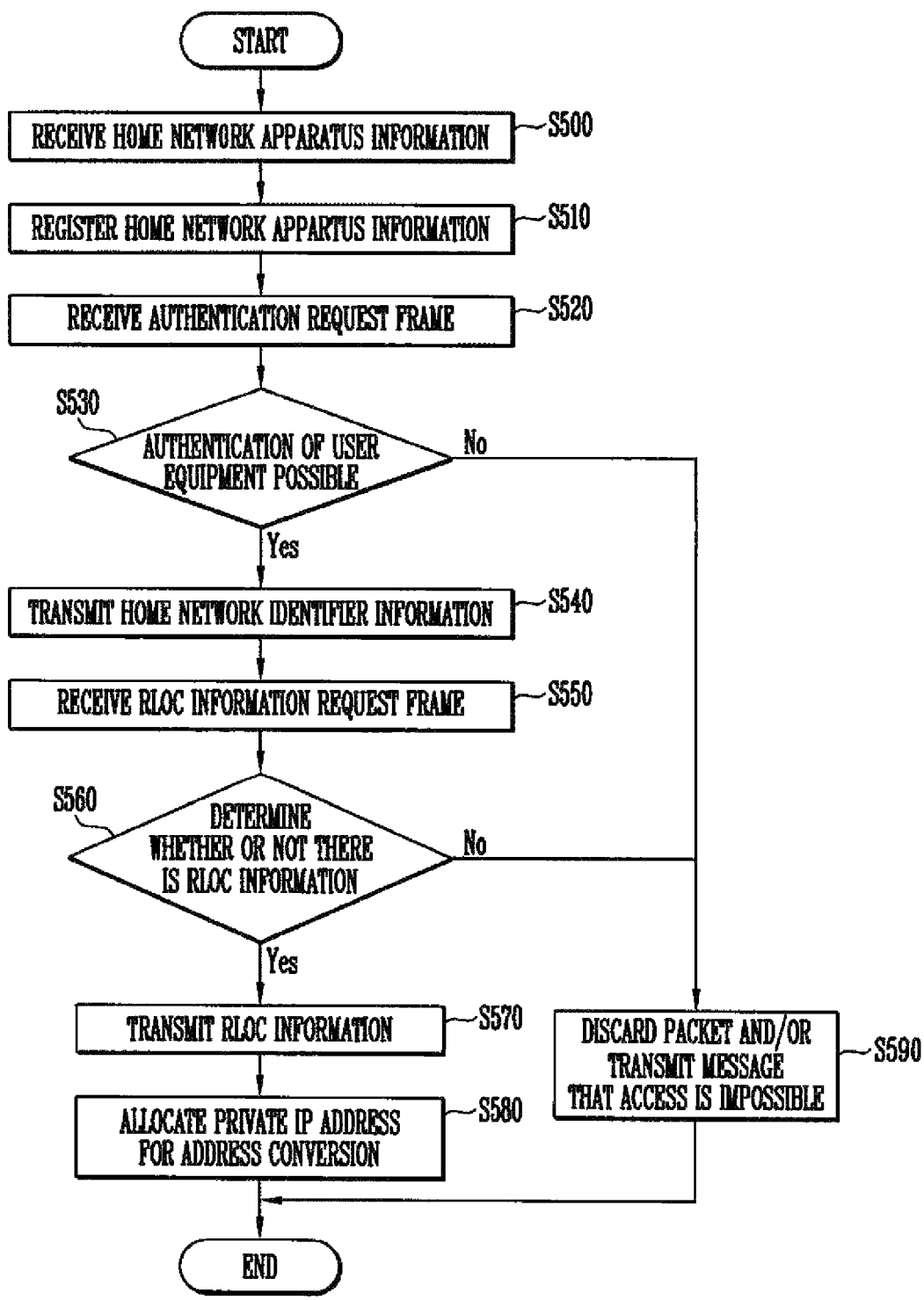
FIG. 5 is a flowchart illustrating an operation of a home network management server according to an embodiment of the present disclosure.

FIG. 5 is a flowchart illustrating an operation of a home network management server according to an embodiment of the present disclosure.

Referring to FIG. 5, the home network management server may receive information on the home network apparatus from the home gateway of the access home network (S500).

As aforementioned, the home network management server may register and manage information on network apparatuses that may access the home network. When the home network apparatus accesses the access home network, the home gateway of the access home network may transmit information on the home network apparatus to the home network management server.

The home network management server registers information on the home network apparatus (S510).

The home gateway of the access home network may receive information on the home network apparatus, and may register, in the home network management server, the home network apparatus as an apparatus that may access the access home network.

An authentication request frame is received from the user equipment (S520).

When intending to access the access home network from not the access home network but another home network, the user equipment may transmit the authentication request frame to the network management server. The authentication request frame may include user equipment identification information.

It is determined whether or not the user equipment is an authenticable apparatus based on the authentication request frame (S530).

The home network management server may perform the authentication procedure based on the authentication request frame. If the identification information of the user equipment included in the authentication request frame is not the information previously registered in the home network management server, it is possible to discard the corresponding authentication request frame or transmit, a message to the user equipment that authentication is not possible (S590).

If the identification information of the user equipment included in the authentication request frame is the information previously registered in the home network management server, it is possible to transmit, to the user equipment, the home network identifier information of the access home network (S540).

The home network identifier information may be used later on for the ITR to request the home network management server for the RLOC of the access network.

The RLOC information request frame is received from the ITR (S550).

The user equipment may transmit, to the ITR, the access request frame based on the received home network identifier information. The ITR may transmit, to the home network management server, the RLOC information request frame based on the access request frame. The RLOC information request frame may be used to request for information on the RLOC of the access home network. In the RLOC information request frame, information on the EID of the home network apparatus, and information on the home network identifier may be included.

The home network management server that received the RLOC information request frame may determine whether or not there is information on the RLOC of the access home network (S560).

For example, the home network management server may determine whether or not there is an RLOC being mapped to the EID based on the information on the EID of the home network apparatus included in the RLOC information request frame received.

If, as a result of determination by the home network management server, there is no information on the RLOC of the access home network, it is possible to discard the frame or transmit to the user equipment a message notifying that access to the access home network failed (S590).

If, as a result of determination by the home network management server, there is information on the RLOC of the access home network, it is possible to transmit information on the RLOC of the access home network to the ITR (S570).

Furthermore, the home network management server may allocate, to the ETR, a separate private IP address for address conversion for performing address conversion of LISP data frame later on (S580).

Figure 6:
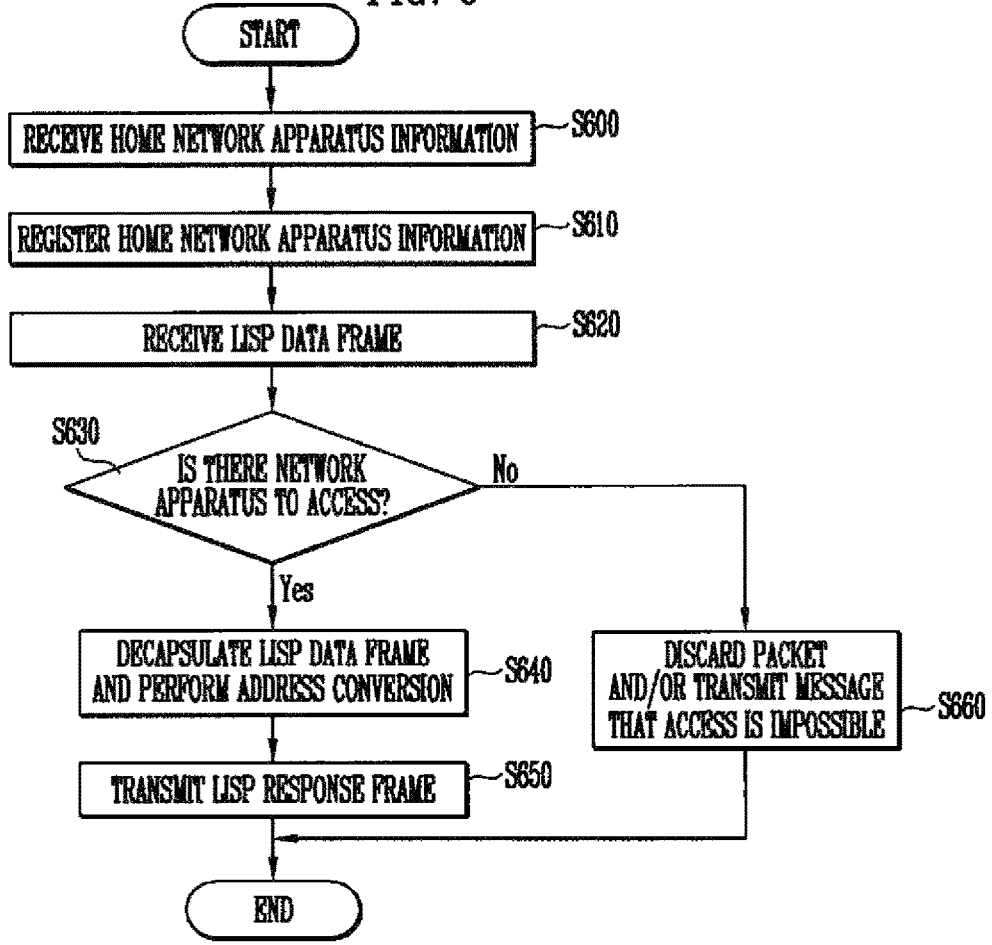
FIG. 6 is a flowchart illustrating an operation of an ETR (access home gateway) according to an embodiment of the present disclosure.

FIG. 6 is a flowchart illustrating an operation of an ETR (access home gateway) according to an embodiment of the present disclosure.

Referring to FIG. 6, the ETR (access home gateway) may receive information for registration of the home network apparatus from the home network apparatus (S600).

The ETR may register the home network apparatus in the home network management server based on the home network apparatus information received (S610).

The ETR receives the LISP data frame (S620).

The ETR may receive the LISP data frame that the ITR transmitted. The LISP data frame may include identifier information of the ITR that transmitted the LISP data frame, identifier information of the ETR that received the LISP data frame, identifier information of the user equipment, and identifier information of the access home network that the user equipment intends to access.

The ETR may determine whether or not there is a network apparatus that the user equipment intends to access based on the LISP data frame (S630).

When the EID of the network apparatus that the user equipment intends to access is an Eli) that is not registered in the access home network, it is possible to discard the data frame received, or transmit a message indicating that the access failed to the user equipment (S660).

When the EID of the network apparatus that the user equipment intends to access is an EID registered in the access home network, it is possible to decapsulate the LISP data frame and perform an address conversion (S640).

The address conversion refers to a private IP address conversion that may be performed using the private IP address for address conversion allocated to the home network management server. Using the converted private IP address generated based on the private IP address for address conversion, the user equipment may access the access network apparatus of the access home network.

The LISP response frame generated from a certain apparatus of the access home network may be transmitted to the user equipment (S650).

The ETR may perform an address conversion that is opposite to the previous address conversion, and may transmit, to the user equipment, the LISP response frame where the tunnel IP header is encapsulated. That is, the converted private IP address allocated to the user equipment may perform an address conversion and be converted into the original private IP address, and be included in the LISP response frame.

Figure 7:
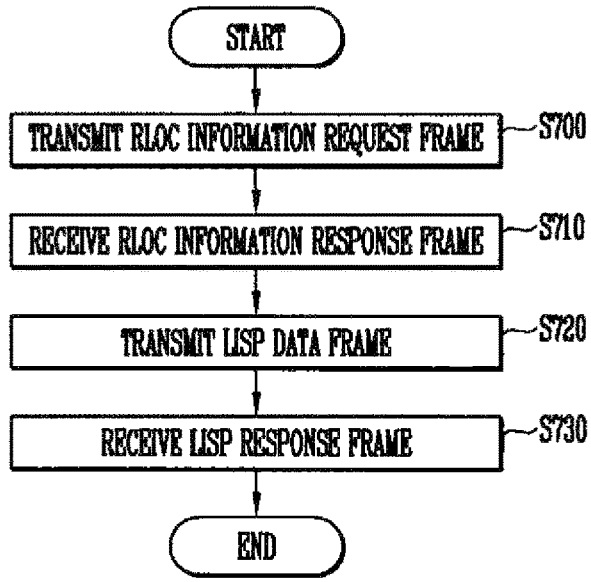
FIG. 7 is a flowchart illustrating an operation of an ITR according to an embodiment of the present disclosure.

FIG. 7 is a flowchart illustrating an operation of an ITR according to an embodiment of the present disclosure.

Referring to FIG. 6, the RLOC information request frame is transmitted (S700).

When the user equipment intends to access the home network apparatus of the access home network, the user equipment may transmit the access request frame to the ITR. In the access request frame, identifier information on the access home network that the user equipment intends to access and identifier information on the home network apparatus that the user equipment intends to access may be included.

The ITR may receive the access request frame, and generate the RLOC information request frame for requesting the home network management server for the RLOC that is the identifier information of the access home network apparatus. The generated RLOC information request frame may be transmitted to the home network management server.

The RLOC information response frame is received (S710).

The ITR may receive the RLOC information response frame in response to the RLOC information request frame. In the RLOC information response frame, the RLOC of the access home network that the user equipment intends to access may be included.

The LISP data frame is transmitted (S720).

The LISP data frame may set the RLOC information of the access home network as the destination IP address, and may include the tunnel IP header having the RLOC information of the current home network as the source IP address. The header of the LISP data frame may be realized by encapsulating the header necessary according to the format of the LISP data frame.

The LISP response frame is received (S730).

The ITR may receive the LISP response frame where the LISP header is encapsulated. The ITR may transmit data to the user equipment based on the received LISP response frame.

Figure 8:
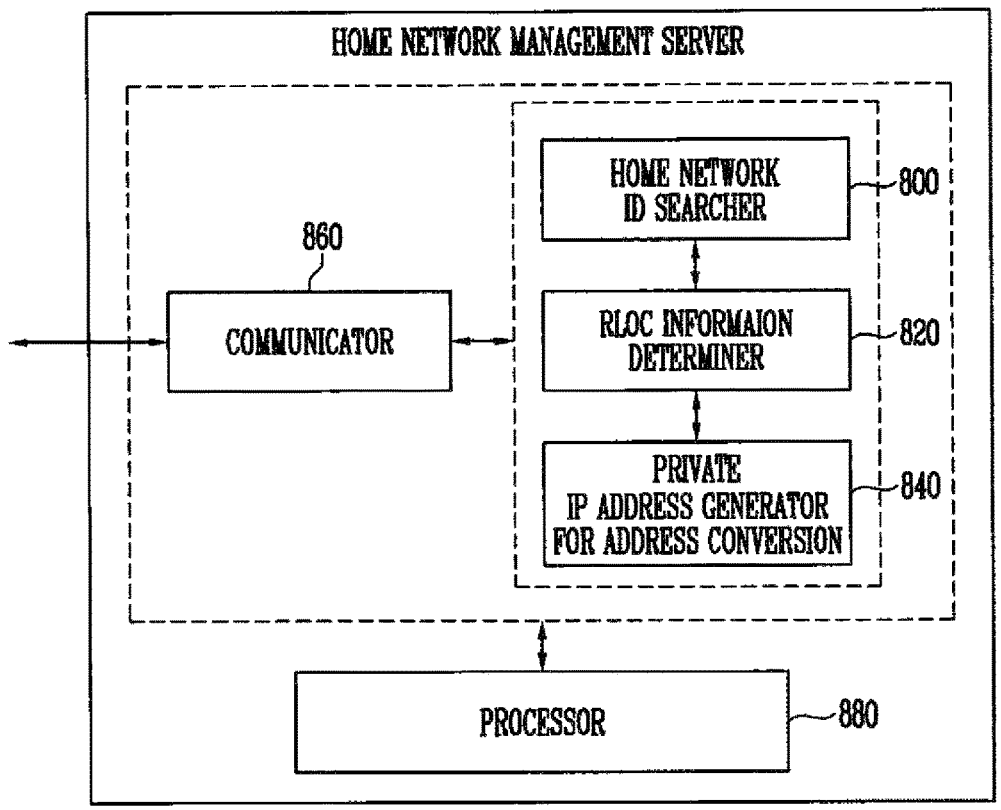
FIG. 8 is a view of a concept of a configuration of a home network management server according to an embodiment of the present disclosure.

FIG. 8 is a view of a concept of a configuration of a home network management server according to an embodiment of the present disclosure.

Referring to FIG. 8, the configurative unit of the home network management server may include a home network ID searcher 800, RLOC information determiner 820, private IP address generator for address conversion 840, communicator 860 and processor 880. Each configurative unit is an exemplary unit illustrated to disclose the functions of the home network management server. One configurative unit may be embodied as a plurality of configurative units, or a plurality of configurative units may be embodied as one configurative unit.

Each configurative unit included in the home network management server may perform the operations of the home network management server disclosed in FIGS. 3 to 5 aforementioned. For example, each configurative unit may perform operations as explained hereinafter.

The home network ID searcher 800 may be embodied to search the identifier information of the access home network (home network ID) based on the identifier information of the user equipment included in the user authentication request frame that the user equipment transmitted. The searched information may be transmitted to the user equipment through the communicator 860.

The RLOC information determiner 820 may be embodied to determine information on the RLOC of the access home network for accessing the access home network based on the home network ID.

The private IP address generator for address conversion 840 may be embodied to generate private IP address information for address conversion for performing an address conversion for accessing the access home network in the ETR.

The communicator 860 may be embodied to receive data from the network configurative unit such as the user equipment, ITR, and ETR, and to transmit the generated data from the home network management server to an external network configurative unit.

The processor 880 may be embodied to control operations of the home network ID searcher 800, RLOC information determiner 820, private IP address generator for address conversion 840, and communicator 860.

Figure 9:
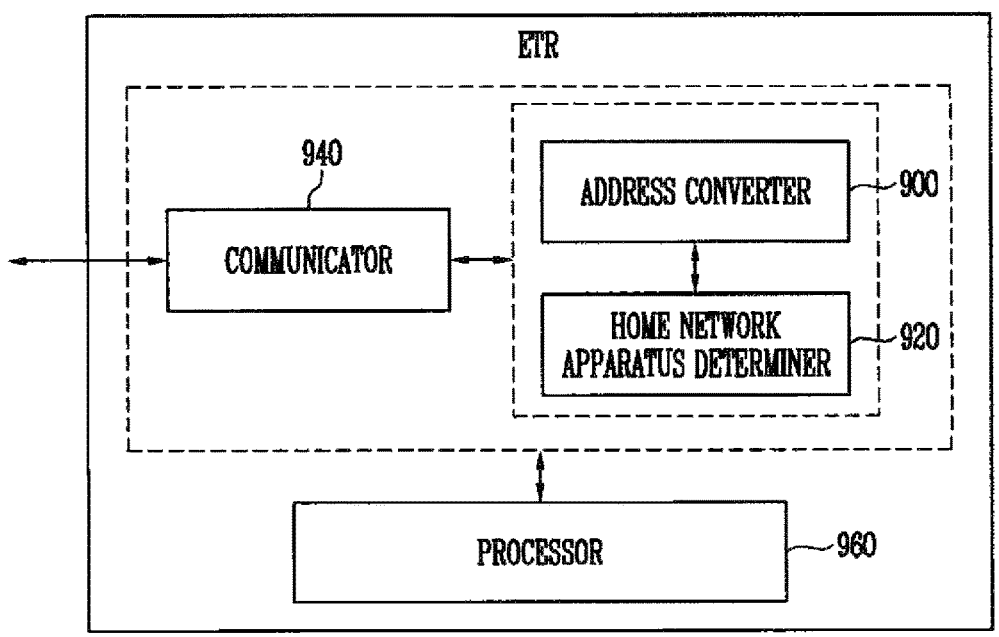
FIG. 9 is a view of a concept of a configuration of an ETR (access home gateway) according to an embodiment of the present disclosure.

FIG. 9 is a view of a concept of a configuration of an ETR (access home gateway) according to an embodiment of the present disclosure.

Referring to FIG. 9, the ETR may include an address converter 900, home network apparatus determiner 920, communicator 940, and processor 960.

Each configurative unit is an exemplary unit illustrated to disclose the functions of the ETR. One configurative unit may be embodied as a plurality of configurative units, or a plurality of configurative units may be embodied as one configurative unit.

Each configurative unit of the ETR may perform operations of the ETR disclosed in FIGS. 1 to 6. For example, each configurative unit may perform operations explained below.

The address converter 900 may convert the private IP address of the user equipment of the LISP data frame into a converted private IP address based on the private IP address information for address conversion received from the home network management server. Furthermore, the address converter 900 may convert the converted private IP address of the user equipment into the original private IP address.

The home network apparatus determiner 920 may determine whether or not there is a home network apparatus designated within the access home network based on the LISP data frame.

The communicator 940 may be embodied to transmit the data generated in the home network apparatus and to receive data generated from outside.

The processor 960 may be embodied to control operations of the address converter 900, home network apparatus determiner 920, and communicator 940.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A network access method for supporting mobility of user equipment, the method comprising:
   receiving, by an access home gateway of an access home network, information on a private IP (Internet Protocol) address for address conversion from a home network management server;
   receiving, by the access home gateway, an LISP (Locator/ID Separation Protocol) data frame that includes a private IP address of the user equipment connected to a current home network;
   converting, by the access home gateway, the private IP address of the user equipment into a converted private IP address using the information on the private IP address for address conversion; and
   transmitting, by the access home gateway, data based on the LISP data frame to a home network apparatus using the converted private IP address,
   wherein the home network apparatus is an apparatus that the user equipment intends to access and that is connected to the access home network, and
   wherein the home network management server is configured to transmit the information on the private IP address for address conversion, in response to a request for information on a Routine Locator (RLOC) of the access home network from a home gateway of the current home network.

2. The method according to claim 1, further comprising:
   receiving, by the access home gateway, response data regarding the LISP data frame from the home network apparatus;
   converting, by the access home gateway, the converted private IP address into the private IP address of the user equipment; and
   transmitting, by the access home gateway, a LISP response frame generated using the private IP address of the user equipment and the response data.

3. The method according to claim 2,
   wherein a header of the LISP data frame comprises information on a source RLOC and a destination RLOC,
   the source RLOC being an identifier for indicating the current home network, and
   the destination RLOC being an identifier for indicating the access home network.

4. The method according to claim 1, wherein the information on the private IP address for address conversion includes information on another private IP address prefix to avoid collision by repeated use of an EID (Endpoint Identifier) based on a private IP address.

5. The method according to claim 1, further comprising:
   receiving, by the access home gateway, a home network apparatus registration request frame that includes identifier information of the home network apparatus;
   transmitting, by the access home gateway, the home network apparatus registration request frame to the home network management server; and
   receiving, by the access home gateway, information on a result of registration of the home network apparatus from the home network management server.

6. An access home gateway of an access home network for supporting mobility of user equipment, the access home gateway comprising a processor,
   wherein the processor is configured to;
   receive information on a private IP (Internet Protocol) address for address conversion from a home network management server;
   receive an LISP (Locator/ID Separation Protocol) data frame that includes a private IP address of the user equipment connected to a current home network; convert the private IP address of the user equipment into a converted private IP address using the information on the private IP address for address conversion; and
   transmit data based on the LISP data frame to a home network apparatus using the converted private IP address, and
   wherein the home network apparatus is an apparatus that the user equipment intends to access and that is connected to the access home network, and
   wherein the home network management server is configured to transmit the information on the private IP address for address conversion, in response to a request for information on a Routing Locator (RLOC) of the access home network from a home gateway of the current home network.

7. The access home gateway according to claim 6, wherein the processor is configured to:

receive response data regarding the LISP data frame from the home network, apparatus;

convert the converted private IP address into the private IP address of the user equipment; and transmit a LISP response frame generated using the private IP address of the user equipment and the response data.

8. The access home gateway according to claim 7, wherein a header of the LISP data frame includes information on a source RLOC and a destination RLOC, the source RLOC being an identifier for indicating the current, home network, and the destination RLOC being an identifier for indicating the access home network.

9. The access home gateway according to claim 6, wherein the information on the private IP address for address conversion includes information on another private IP address prefix to avoid collision by repeated use of an EID (Endpoint Identifier) based on a private IP address.

10. The access home gateway according to claim 6, wherein the processor is configured to;

receive a home network apparatus registration request frame that includes identifier information of the home network apparatus;

transmit the home network apparatus registration request frame to the home network management server; and receive information on a result of registration of the home network apparatus from the home network management server.

* * * * *